United States Patent

Akinson

[15] 3,645,746

[45] Feb. 29, 1972

[54] PRESERVATION OF PROTEINACEOUS MATERIALS AND EDIBLE FIBERS SPUN THEREFROM

[72] Inventor: William T. Akinson, Minneapolis, Minn.

[73] Assignee: Archer Daniels Midland Company, Minneapolis, Minn.

[22] Filed: Feb. 7, 1969

[21] Appl. No.: 797,668

[52] U.S. Cl.................................99/17, 99/99, 99/150
[51] Int. Cl.............................A23j 1/14, A23l 1/20
[58] Field of Search ...........................99/14, 17, 98, 99

[56] References Cited

UNITED STATES PATENTS 2,930,700   3/1960   Bradof............................99/99

Primary Examiner—A. Louis Monacell
Assistant Examiner—William Andrew Simons
Attorney—Plumley, Tyner & Sandt

[57] ABSTRACT

A process for preserving aqueous proteinaceous materials, e.g. soy flour, and the process of spinning edible fibers comprising the steps of:

I. heating the proteinaceous material to a temperature of above 140° F. in aqueous slurry, and then
II. treating a mixture of the heat-treated protein, a water soluble alginate and water with peroxide,
III. adding carrageenin before or after heat treatment, and then
IV. spinning the mixture into a coagulating bath, e.g. aqueous $CaCl_2$.

12 Claims, No Drawings

PRESERVATION OF PROTEINACEOUS MATERIALS AND EDIBLE FIBERS SPUN THEREFROM

In recent years, proteinaceous materials, especially those comprising soy flour and a metal alginate, have found increasing acceptance as foodstuffs for human consumption. In particular, these proteinaceous materials can be "spun" by extruding them through a spinnerette having a plurality of holes to produce fibrous proteinaceous materials resembling meat, such as beef, pork, or chicken. Such spinning processes are described in Giddey, U.S. Pat. No. 2,947,644, and Ishler, U.S. Pat. No. 3,093,483. However, considerable difficulty has been experienced before, during, and after spinning, due to the difficulty of preserving these proteinaceous materials and not permitting bacterial growth to occur. A number of preservatives and processes for preservation have been suggested; however, these suffer from one or more disadvantages, such as high cost, incomplete solubility of the preservative in the proteinaceous material, undesirable changes in taste and/or appearance of the proteinaceous materials, and harmful side effects due to the toxicity of certain preservatives.

Accordingly, it is an object of the present invention to provide a process for preserving proteinaceous materials substantially free from one or more of the disadvantages of prior processes. Another object is to provide a process which is inexpensive, employs a preservative which is completely soluble in the proteinaceous materials, does not adversely affect taste or appearance, and is nontoxic to humans. Other objects and advantages of the present invention will be apparent by reference to the following detailed description thereof.

Briefly, the process of the present invention accomplishes the preservation of proteinaceous materials by the steps of:

I. heating the proteinaceous material to a temperature above 140° F., and

II. treating a mixture of the heat-treated protein, a water soluble alginate, and water with peroxide.

The treated proteinaceous materials of this invention are especially useful in the preparation of edible spun fibers. It is desirable to include carrageenin prior to spinning. Accordingly, the invention also involves the subsequent steps of:

III. adding carrageenin to the protein-alginate mixture before or after the heat treatment step (I), and then IV. spinning the mixture into a coagulating bath.

Although any suitable means can be employed for heating the proteinaceous material, in a preferred embodiment the proteinaceous material is mixed with water to form a slurry which is then admixed with a solution of the soluble alginate to form a mixture. This mixture is then heated to a temperature above 140° F. and below the boiling point of the material, and preferably at a temperature of 140° F. to 180° F. The heating is continued until the mixture no longer decomposes peroxide, which generally occurs after heating periods of from 5 to 60 minutes. Heating periods of about 10 to 30 minutes have been found to be satisfactory and are preferred. Heating periods in excess of 4 hours are to be avoided because of resultant undesirable darkening of the proteinaceous materials and a reduction in toughness and tensile strength. Conducting the heating step within the preferred temperature range and for the preferred time increases the tensile strength of the fibers. The protein can be heated separately if desired, and the alginate can then be added. It is important, however, that the alginate addition be made before the peroxide treatment. In a preferred embodiment of the present invention, the heating step is effected by directing live steam into the proteinaceous materials until the desired temperature is reached. The proteinaceous materials can be maintained at the desired temperature for the duration of the heating step by employing small additional amounts of steam. The steam can be saturated or superheated at pressures of 0 to 100 p.s.i.g., but saturated steam at 0 to 20 p.s.i.g. is preferred for ease of handling. The peroxide can be added at any convenient time after completion of the heating step and while the proteinaceous materials are still hot, or after their temperature has been reduced. However, it is preferably added immediately after the heating step for maximum preservation, and preferably while the proteinaceous materials are still at a temperature substantially equal to that of the heating step. The necessity of a cooling step is thereby eliminated.

The process of the present invention is not limited to any particular type of protein. Any type of edible protein of vegetable, fish, or animal origin may be employed. The preferred proteins from the standpoint of an optimum product are the oil seed proteins such as peanut, cotton seed, sesame seed, or soybean proteins. The protein may be employed in substantially pure or water-soluble form, or, as is preferred, in the form of flakes or flour, generically herein referred to as meal, obtained on solvent extraction of oils and other fatty materials. Solvent extraction of oil seeds to remove oil and other fatty materials is well known in the art and thus need not specifically be described. The proteincontaining oil seed meals which have protein concentrations of 40 to 70 percent are preferred.

The compositions utilized in the process of the present invention can have widely varying weight ratios of protein to soluble alginate, but these ratios are generally between 1:100 and 100:1, and preferably between 2:1 and 20:1. The water present in the mixture can comprise up to 95 weight percent, based on the combined weight of protein, soluble alginate, and water.

The peroxide is generally added as an aqueous solution. The peroxide solution is added to the proteinaceous materials in amounts providing up to 2.0 and preferably 0.01 to 1.0 weight percent peroxide, based on the combined weight of protein and soluble alginate.

The peroxide can be any water-soluble peroxide capable of decomposition to release oxygen in the presence of catalase. Inorganic peroxides, especially alkali metal peroxides such as sodium peroxide and potassium peroxide, can be used. Hydrogen peroxide is especially preferred.

The soluble alginates useful in the present invention are generally those having nontoxic monovalent anions, and preferably those of ammonium, potassium, or sodium, sodium alginate being the most preferred. Commercially available alginates are suitable for use in the present invention as disclosed in the following examples.

Although it is not desired to limit the present invention to any particular theory, the following is offered by way of possible explanation to those skilled in the art. As a result of their normal metabolic processes, bacteria produce enzymes such as peroxidase and catalase. These enzymes decompose peroxide yielding nascent oxygen which kills the bacteria. However, soy flour apparently contains a factor which decomposes peroxide. This factor, believed to be catalase, is heat-sensitive and can be denatured by heating it to temperatures above about 140° F. for 5 to 60 minutes. It has been found that, without this prior heating step, the peroxide is ineffective to preserve the proteinaceous materials. Other means for denaturing the catalase present in the soy flour would be expected to be equally effective if otherwise suitable. The necessity for the presence in the proteinaceous materials of an amount of the soluble alginate is not understood; however, it has been found that preservation by peroxide is ineffective in the absence of the alginate.

The bacteria-inhibited protein-alginate composition resulting from the above-described process can be directly spun into edible fibers by extrusion of the composition into a coagulating bath in accordance with known methods. The coagulating bath advantageously contains alkaline earth metal ion, preferably calcium ion, as disclosed in U.S. Pat. No. 3,093,483 to Ishler, et al.

While the bacteria inhibited protein-alginate composition can be directly spun as described above, it has been found that the inclusion of small amounts of carrageenin improves the qualities of the edible fiber. Accordingly, it is preferred that carrageenin be incorporated into the mix prior to spinning. The amount of carrageenin can vary widely but 0.1 to 10 weight percent based upon the total amount of protein-alginate-carrageenin present is preferred. The preferred proportions of carrageenin are from 1.0 to 5.0 weight percent calculated as above.

The carrageenin can be added at any time prior to extrusion including addition prior to peroxide treatment.

The invention is further illustrated by the following examples in which all parts and percentages are by weight unless otherwise indicated. These non-limiting examples are illustrative of certain embodiments designed to teach those skilled in the art how to practice the invention, and to represent the best mode contemplated for carrying out the invention.

EXAMPLE 1

This example illustrates the preservation of proteins in accordance with the process of this invention.

The following quantities of the following ingredients are combined as indicated:

| Item | Ingredient | Quantity |
| --- | --- | --- |
| A | Soy Flour | 5,400 g. |
| B | Water at 100° F. | 15,750 ml. |
| C | Sodium Alginate (Kelco HJ) | 518 g. |
| D | Water at 212° F. | 27,000 ml. |
| E | Hydrogen Peroxide (50 wt. % aqueous solution) | 98 ml. |
| F | DYTOL (Rohm & Haas) (60% Lauryl Alcohol), | 5 ml. |

Items A and B are thoroughly mixed in a first vessel, and Items C and D are thoroughly mixed in a second vessel. The contents of the first vessel are then poured into the second vessel to form an alginate/soy flour slurry having a temperature of 135° F., which is then heated (for approximately 10 minutes) to 170° F., and held at a temperature of 170° F. for a period of 0–5 minutes. At the end of this period E and F are added. The slurry exhibits no bacterial count even after 20 hours.

EXAMPLE 2

This example illustrates the spinning of edible fibers from the bacteria inhibited protein-alginate composition of this invention.

The protein-alginate composition of Example 1 is extruded through a spinnerette having a plurality of holes into a coagulating solution comprising:

| Item | Ingredient | Quantity |
| --- | --- | --- |
| | $CaCl_2 \cdot 2H_2O$ | 1,005 g. |
| | Water | 15,000 ml. |
| | HCl (37 wt. % aqueous solution) | 75 ml. |

The ingredients are mixed together to form a coagulating bath having an initial pH of 1.3.

A hank of spun tow was washed in water before storage to prevent hydrolysis of the fiber at low pH's. The washed fiber had a pH of 3.8.

EXAMPLE 3

This example illustrates the spinning of edible fibers from the bacteria-inhibited protein-alginate composition of this invention containing added carrageenin.

To the protein-alginate composition of Example 1 98 g. of carrageenin was added and thoroughly mixed. The resulting composition was then extruded into edible fibers in the manner described in Example 2.

EXAMPLE 4

This example illustrates protein preservation by the process of the present invention wherein carrageenin is added prior to peroxide treatment.

The following quantities of the following ingredients are combined as indicated.

| Item | Ingredient | Quantity |
| --- | --- | --- |
| A | Soy Flour | 900 g. |
| B | Water at 68° F. | 2,500 ml. |
| C | DYTOL (Rohm & Haas) (60% Lauryl Alcohol) | 1 ml. |
| D | Sodium alginate (Kelco HV) | 72 g. |
| E | Water at 200° F. | 4,000 ml. |
| F | Carrageenin | 18 g. |
| G | Hydrogen Peroxide (50 wt. % aqueous solution) | 16 ml. |
| H | Water | 1,000 ml. |
| I | Fat (available from Proctor & Gamble Co. under trade name "Crisco") | 45 g. |
| J | Sodium Hydroxide (2.5 N: 10 wt. % aqueous solution) | 50 ml. |

Items A, B, and C are thoroughly mixed in a first vessel, and Items D and E are thoroughly mixed in a second vessel. The contents of the first vessel are then poured into the second vessel to form an alginate/soy flour slurry having a temperature of 135° F., which is then heated to 170° F. for about 10 minutes and held at that temperature for a period of 0–5 minutes. At the end of this period, F, G, and H are added. Item I is then added, followed by Item J. The resultant mixture has a viscosity of 6,000 c.p.s. and a pH of 7.8.

The mixture is deaerated by placing in a vacuum chamber and then spun through a spinnerette into a coagulating solution.

The coagulating solution is formulated from the following quantities of the following ingredients.

| Item | Ingredient | Quantity |
| --- | --- | --- |
| K | $CaCl_2 \cdot 2H_2O$ | 1,005 g. |
| L | Water | 15,000 ml. |
| M | HCl (37 wt. % aqueous solution) | 75 ml. |

Items K, L, and M are mixed together to form a coagulating bath having an initial pH of 1.3.

A hank of spun tow was washed in water before storage to prevent hydrolysis of the fiber at low pH. The washed fiber had a pH of 3.8.

EXAMPLE 5

This example illustrates the synthesis of a fibrous protein product resembling chicken meat from the fibers of Example 4.

The following quantities of the following ingredients are combined as indicated.

| Item | Ingredient | Quantity |
| --- | --- | --- |
| A | Fiber of Example 4 | 1,140 g. |
| B | Water | 720 ml. |
| C | Chicken Powder (available from the Henningson Co.) | 228 |
| D | Chicken Fat (rendered) | 234 g. |
| E | Egg Albumen | 64 g. |

The hank of Example 4 cut in 12 inch lengths was boiled 30 minutes in 0.1 percent $CaCl_2$, rinsed in cold water, dewatered and deaerated in a centrifuge. Binder was buttered onto fibers and coated fibers were pressed into greased Ham boiler. The boiler was closed under heavy pressure and product was boiled for 30 minutes at 15 p.s.i.g. The block was then refrigerated. Flavor and color were good. The texture was slightly softer than straight alginate soy flour fiber.

as in Example 1. The separate slurries were heat treated by heating to 175° F. for 30 minutes and promptly cooled. The treated slurries were combined as indicated in Table II below and tested by inoculation and incubation as in Example 6. The results are tabulated in Table II and indicate that the thermolabile factor which inhibits peroxide preservation is present in soy flour but not alginate and that the presence of alginate is necessary for preservation of soy flour with peroxide.

TABLE II

| Example | Soy flour slurry | | Sodium alginate slurry | | Combined after heating | E. coli added | * 0.1% hydrogen peroxide added | Bacteria per gram | |
|---|---|---|---|---|---|---|---|---|---|
| | Heated | Unheated | Heated | Unheated | | | | Before incubation | Incubated 16 hrs. at 98.6° F. |
| 7-1 | None | Yes | None | Yes | Yes | Yes | Yes | 3,700,000 | 4,600,000,000,000 |
| 7-2 | None | Yes | Yes | None | Yes | Yes | Yes | 4,200,000 | 770,000,000,000 |
| 7-3 | Yes | None | None | Yes | Yes | Yes | Yes | 5,100,000 | 0 |
| 7-4 | Yes | None | Yes | None | Yes | Yes | Yes | 960,000 | 0 |
| 7-5 | None | Yes | None | None | | Yes | Yes | 3,500,000 | 3,000,000,000,000 |
| 7-6 | Yes | None | None | None | | Yes | Yes | 4,100,000 | 340,000,000 |
| 7-7 | None | None | None | Yes | | Yes | Yes | 5,600,000 | 0 |
| 7-8 | None | None | Yes | None | | Yes | Yes | 7,800,000 | 0 |

EXAMPLE 6

This example illustrates the protein preservation process of the present invention employing different conditions.

The procedure of Example 1 is repeated with the exception that times, temperatures, and conditions were varied as indicated below in Table I. The weight percent of hydrogen peroxide was based on the total system including water, soy flour, and alginate. After hydrogen peroxide treatment, bacterial counts were made, the samples were then inoculated with a culture E. coli. and incubated for 16 hours at 98.6° F. After incubation, another bacterial count was made to determine if the slurry sample was preserved by the treatment. In Example 6-15, catalase in the amount of 0.005 weight percent based on the total system (water, soy flour, and alginate) was added to the slurry after heating and before peroxide addition. The results are summarized in Table I below and indicate:

1. that the heat treatment is necessary to destroy the thermolabile factor which interferes with the preservative effect of hydrogen peroxide;
2. that cooling prior to hydrogen peroxide addition is not necessary;
3. that catalase is the thermolabile factor present in soy flour which interferes with the preservative effect of hydrogen peroxide; and
4. that the inoculum of E. coli. is not necessary to the operativeness of the process.

Although the invention has been described in considerable detail with reference to certain preferred embodiments thereof, it will be understood that variations and modifications can be effected within the spirit and scope of the invention as described above and as defined in the appended claims.

What is claimed is:

1. A process for preserving aqueous proteinaceous materials, said process comprising the steps of:
   I. heating soy flour to a temperature above 140° F., for 5 to 60 minutes, and then
   II. treating a mixture of the heat-treated soy flour, a soluble alginate, 0 to 10 weight percent of carrageenin based on said soy flour alginate-carrageenin mixture and water with a water-soluble peroxide;
   the weight ratio of soy flour:alginate being in the range of 1:100 to 100:1.

2. A process for inhibiting bacterial growth in an aqueous proteinaceous mixture comprising:
   A. 1 to 100 parts soy flour containing naturally occurring amounts of catalase, and
   B. 1 to 100 parts soluble alginates, said process comprising the steps of:
   I. denaturing the catalase, and then
   II. adding water-soluble peroxide to the aqueous proteinaceous materials.

3. A process for inhibiting bacterial growth in an aqueous mixture comprising 1 to 100 parts by weight soy flour and 1 to

TABLE I

| Experiment No. | Temperature of heat treatment (° F.) | Time of heat treatment (minutes) | E. coli added | 0.1% hydrogen peroxide added to— | | Bacteria per gram | |
|---|---|---|---|---|---|---|---|
| | | | | Cold slurry | Hot slurry | Before incubation | After incubation |
| 6-1 | None | | Yes | No | | $5 \times 10^7$ | $98 \times 10^7$ |
| 6-2 | None | | Yes | Yes | | $78 \times 10^6$ | $16 \times 10^8$ |
| 6-3 | 180 | 30 | Yes | No | | $16 \times 10^6$ | $74 \times 10^9$ |
| 6-4 | 180 | 30 | Yes | Yes | | $15 \times 10^3$ | 0 |
| 6-5 | None | | Yes | No | | $24 \times 10^5$ | $61 \times 10^6$ |
| 6-6 | None | | Yes | Yes | | $15 \times 10^5$ | $10 \times 10^{10}$ |
| 6-7 | 165 | 30 | Yes | No | | $45 \times 10^4$ | $48 \times 10^9$ |
| 6-8 | 165 | 30 | Yes | Yes | | $25 \times 10^4$ | 0 |
| 6-9 | None | | Yes | | No | $78 \times 10^4$ | $72 \times 10^{10}$ |
| 6-10 | None | | Yes | | Yes | $12 \times 10^5$ | $66 \times 10^{10}$ |
| 6-11 | 177 | 30 | Yes | | No | $11 \times 10^5$ | $14 \times 10^{11}$ |
| 6-12 | 177 | 30 | Yes | | Yes | $65 \times 10^4$ | 20 |
| 6-13 | None | | Yes | | No | $11 \times 10^3$ | $2 \times 10^9$ |
| 6-14 | 175 | 30 | Yes | | Yes | $14 \times 10^4$ | 100 |
| 6-15 | 175 | 30 | Yes | | Yes | $75 \times 10^4$ | $57 \times 10^{11}$ |
| 6-16 | 175 | 30 | No | | Yes | 290 | 80 |

EXAMPLE 7

This example illustrates the necessity of mixing alginate and protein prior to peroxide treatment and further shows that the heat labile factor is present in the soy protein and not in the alginate.

Separate slurries of soy flour in water, and sodium alginate in water, respectively, were prepared using quantities so that when combined the final proportions of ingredients would be 100 parts by weight soluble alginates, said process comprising the steps of:
   I. heating the soy protein alone or in the presence of alginate to a temperature from 140° F. for 5 to 60 minutes up to 180° F., and then
   II. adding water-soluble peroxide to said aqueous mixture.

4. The process of claim 3 wherein the peroxide is present in the mixture in an amount from about 0.01 to 1.0 weight percent, based on the combined weight of soy flour and soluble alginate.

5. The process of claim 3 wherein the weight ratio of soy flour:soluble alginate is 2:1 to 20:1.

6. The process of claim 3 wherein the soluble alginate is sodium alginate.

7. The process of claim 3 wherein the water-soluble peroxide is hydrogen peroxide.

8. The process of claim 3 wherein the water-soluble peroxide is added to the aqueous proteinaceous materials while said materials are at a temperature substantially equal to that of the heating step.

9. The process of claim 3 wherein the heating of the aqueous proteinaceous materials is effected by contacting live steam with the materials.

10. Aqueous proteinaceous materials which are hostile to bacterial growth, comprising:
  A. a soluble alginate,
  B. soy flour which has been heated to at least 140° F. for at least 5 minutes,
  C. 1 to 10 weight percent of carrageenin,
  D. water, and
  E. up to 2.0 weight percent of water-soluble peroxide based on the combined weight of A, B, and C; wherein the weight ratio of A:B is 1:100 to 100:1.

11. The material of claim 10 wherein C comprises 0.1 to 10 weight percent based on the weight of A, B, and C.

12. An edible food fiber comprising a coagulated fiber prepared from the composition of claim 11.

* * * * *